US008673837B2

(12) United States Patent
Ghosh Dastidar et al.

(10) Patent No.: US 8,673,837 B2
(45) Date of Patent: Mar. 18, 2014

(54) SHAPED SOLID CLEANING COMPOSITION

(75) Inventors: Sudipta Ghosh Dastidar, Bangalore (IN); Sujitkumar Suresh Hibare, Bangalore (IN); Janhavi Sanjay Raut, Sharnbrook (GB); Suman Kumar Bhattacharya, Bangalore (IN)

(73) Assignee: Conopco Inc., Engelwood Cliffs, NJ (US)

( * ) Notice: Subject to any disclaimer, the term of this patent is extended or adjusted under 35 U.S.C. 154(b) by 35 days.

(21) Appl. No.: 13/389,928

(22) PCT Filed: Jul. 26, 2010

(86) PCT No.: PCT/EP2010/060784

§ 371 (c)(1),
(2), (4) Date: Feb. 10, 2012

(87) PCT Pub. No.: WO2011/020679

PCT Pub. Date: Feb. 24, 2011

(65) Prior Publication Data

US 2012/0196787 A1 Aug. 2, 2012

(30) Foreign Application Priority Data

Aug. 17, 2009 (IN) ......................... 1878/MUM/2009

(51) Int. Cl.

| | |
|---|---|
| ***C11D 17/00*** | (2006.01) |
| ***C11D 11/00*** | (2006.01) |
| ***C11D 7/20*** | (2006.01) |
| ***C11D 9/18*** | (2006.01) |
| ***C11D 13/16*** | (2006.01) |
| ***C11D 13/18*** | (2006.01) |
| ***B29C 47/00*** | (2006.01) |
| ***B29C 39/00*** | (2006.01) |

(52) U.S. Cl.
USPC ........... 510/445; 510/446; 510/141; 510/151; 510/152; 510/224; 510/294; 510/298; 510/440; 510/450; 510/451; 510/470; 510/474; 510/486; 510/491; 510/507; 264/148; 264/212

(58) Field of Classification Search
USPC ......... 510/445, 446, 141, 151, 152, 224, 294, 510/298, 440, 450, 451, 463, 470, 474, 486, 510/491, 507; 264/148, 212
See application file for complete search history.

(56) References Cited

U.S. PATENT DOCUMENTS

| | | | | |
|---|---|---|---|---|
| 2,697,699 | A | 12/1954 | Cohn | |
| 2,982,665 | A | 5/1961 | Wilcox | |
| 3,211,565 | A | 10/1965 | Bundy | |
| 3,450,666 | A | 6/1969 | Nease | |
| 4,637,933 | A | 1/1987 | Zabotto nee Arribau et al. | |
| 4,666,624 | A | 5/1987 | Irlam et al. | |
| 4,715,986 | A | 12/1987 | Gruning et al. | |
| 4,857,308 | A | 8/1989 | Fukasawa et al. | |
| 4,916,095 | A | 4/1990 | Fogler et al. | |
| 5,137,568 | A | 8/1992 | Durham | |
| 5,317,568 | A | 5/1994 | Bixby | |
| 5,449,402 | A | 9/1995 | Whalen-Shaw | |
| 5,527,430 | A | 6/1996 | Gill | |
| 5,603,411 | A | 2/1997 | Williams | |
| 5,871,764 | A | 2/1999 | Diaz et al. | |
| 6,165,485 | A | 12/2000 | Alther | |
| 6,288,076 | B1 | 9/2001 | Kostyniak et al. | |
| 6,498,134 | B1 | 12/2002 | Scheibel et al. | |
| 6,541,440 | B2 | 4/2003 | Heininger | |
| 6,649,147 | B1 | 11/2003 | Ye et al. | |
| 6,774,099 | B1 | 8/2004 | Scheibel et al. | |
| 6,794,437 | B2 | 9/2004 | Ross | |
| 6,828,288 | B2 * | 12/2004 | Takeshima | 510/108 |
| 7,772,181 | B2 | 8/2010 | Amin et al. | |
| 7,977,302 | B2 | 7/2011 | Chakrabarty et al. | |
| 2002/0039986 | A1 | 4/2002 | Heininger | |
| 2006/0111259 | A1 * | 5/2006 | Chakrabarty et al. | 510/141 |
| 2007/0107635 | A1 | 5/2007 | Soane | |
| 2008/0220050 | A1 | 9/2008 | Chen et al. | |
| 2009/0246529 | A1 * | 10/2009 | Bhattacharya et al. | 428/404 |

FOREIGN PATENT DOCUMENTS

| | | | |
|---|---|---|---|
| CH | 397127 | | 8/1965 |
| CH | 397127 | A | 8/1965 |
| DE | 220328 | A1 | 3/1985 |
| DE | 19538029 | A1 | 4/1997 |
| EP | 0318642 | | 9/1987 |

(Continued)

OTHER PUBLICATIONS

Domka, 1994, Modification estimate of kaolin, chalk, and precipitated calcium carbonate as plastomer and elastomer fillers, Colloid & Polymer Science, 272, 1190-1202, A. Mickiewicz University, Poznan.

Gardolinski et al, Dec. 1, 2005, Grafted organic derivatives of kaolinite: I. Synthesis, chemical and reheological characterization, Clay Minerals, 40-4, 537-546, Mineralogical Society of Great Britain & Ireland.

Itagaki et al, 2003, Organic modification of the interlayer surface of kaolinite with propanediols by transesterification, J. Mater. Chem, 13, 1064-1068.

Perro et al., 2005, Design and synthesis of Janus micro- and nanoparticles, Journal Materials Chemistry, 15, 3745-3760.

(Continued)

*Primary Examiner* — Lorna M Douyon
(74) *Attorney, Agent, or Firm* — Karen E. Klumas

(57) ABSTRACT

A shaped solid cleaning composition, especially in bar format, which utilises the detergency properties of new materials which are more efficient, relatively inexpensive and are environmentally friendly alternatives to conventional soaps or synthetics surfactants; more particularly, a shaped solid cleaning composition which comprises a specific amount of structuring agent and a specific amount of a treated particle. The precursor of the treated particle is an asymmetric 1:1 or 2:1:1 clay particle having alternating tetrahedral and octahedral sheets terminating with a tetrahedral sheet at a first external surface plane and an octahedral sheet at a second external surface plane. Either or both of said external surfaces is attached with a fatty acid or derivative thereof.

13 Claims, No Drawings

(56) References Cited

FOREIGN PATENT DOCUMENTS

| | | | |
|---|---|---|---|
| EP | 0265101 | A2 | 4/1988 |
| EP | 0319168 | A1 | 6/1989 |
| EP | 0927748 | A1 | 7/1999 |
| EP | 2105469 | A1 | 9/2009 |
| FR | 93672 | | 5/1969 |
| GB | 867752 | | 5/1961 |
| GB | 1425177 | | 2/1976 |
| GB | 2011786 | A | 7/1979 |
| GB | 710129 | A | 11/2012 |
| JP | 62277316 | | 12/1987 |
| JP | 2001-122749 | | 5/2001 |
| JP | 2001122749 | A | 5/2001 |
| JP | 2004-359483 | | 12/2004 |
| JP | 2004359483 | A | 12/2004 |
| WO | WO9905249 | | 2/1999 |
| WO | WO2005011622 | A1 | 2/2005 |
| WO | WO2005059079 | A1 | 6/2005 |
| WO | WO2006053708 | A1 | 5/2006 |
| WO | WO2008152417 | A2 | 12/2008 |
| WO | WO2009118421 | A1 | 10/2009 |
| WO | WO2011020679 | A1 | 2/2011 |
| WO | WO2011036029 | A1 | 3/2011 |

OTHER PUBLICATIONS

Viseras et al., 2007, Uses of clay minerals in semisolid health care and therapeutic products, Applied Clay Science, 36, 37-50, Elsevier.

International Search Report PCT/EP2010/060784 dated Oct. 27, 2010.

Co-Pending U.S. Appl. No. 13/496,898, filed Mar. 19, 2012 titled "An Antimicrobial Particle and a Process for Preparing the Same".

Co-Pending U.S. Appl. No. 12/933,883, filed Sep. 22, 2010; titled "A Particle With Bipolar Topospecific Characteristics and Process For Preparation Thereof".

U.S. Appl. No. 13/129,132, filed Aug. 12, 2011; titled "A Personal Cleansing Composition".

Gardolinski et al., "Grafted organic derivatives of kaolinite: I. Synthesis, chemical and rheological characterization", Clay Minerals, Sep. 2005, vol. 40, pp. 537-546.

* cited by examiner

SHAPED SOLID CLEANING COMPOSITION

TECHNICAL FIELD

The invention relates to a shaped solid cleaning composition that utilises the detergency properties of new materials which are more efficient, relatively inexpensive and are environmentally friendly alternatives to conventional soaps or synthetic surfactants which have been used heretofore in such cleaning compositions. The present invention more particularly relates to a cleaning composition in bar format.

BACKGROUND OF THE INVENTION

Cleaning compositions in shaped solid form have many advantages over other forms like liquid emulsion, gel or lotion forms. Most popular shaped solid forms are bars and tablets. Bars and tablets have the advantage over liquid or semi-solid forms in that they require minimal packaging and can be easily held by the consumer when applying the product on the desired substrate. However, shaped solid forms of cleaning compositions have to be carefully processed in order to give the desired shape stability during manufacture, transportation, storage and use by the consumer. The retention of the shape is important during the above stages between manufacture and use while ensuring that the rate of wear of the product during use is optimal. The shaped solid composition should abrade to the desired amount when applied by the consumer on the desired surface, while being long-lasting enough, so that the consumer is satisfied about the benefit derived to the cost paid for the product.

Shaped solid cleaning products have been conventionally made with insoluble soaps (stearates and palmitates) as the structuring agents to give the soap the desired shape while soluble soaps or synthetic surfactants provide the cleaning action. Many particulates e.g. starch or modified starch, inorganics particles like talc, calcite, clays (e.g. china clay) have also been incorporated in shaped solid cleaning compositions as structuring aids. Most of the above conventional agents added to shaped solid cleaning compositions perform one or the other function i.e. either cleaning or structuring, but not both. In fact, in most cases, they interact oppositely and it is often a struggle for a manufacturer to achieve both requirements in one go.

Certain highly absorbent materials like clay e.g. bentonite, attapulgite, kaolinite etc which are known to absorb oils have been used in cleaning compositions, but have had limited usefulness when incorporated in personal cleaning compositions.

Many researchers have tried to develop tailored materials to be incorporated in shaped solid cleaning compositions to provide various functionalities. Certain functionalised particulate materials have also been designed. Examples of design and synthesis of such particles are described in a review by Perro et al, J. Material Chem., 2005, 15, p3745-3760. One of the approaches used in the past is disclosed in U.S. Pat. No. 4,715,986 (Th. Goldschmidt AG, 1987) which describes particles for stabilizing or destabilizing emulsions of a size less than 100 microns, comprising fragments having on one side thereof hydrophilic group and on the other side thereof hydrophobic groups such that the hydrophilic and the hydrophobic groups are anisotropically distributed in a non-statistical manner. One of the methods for obtaining such fragments is by communition of hollow microspheres. In all the methods that are described heretofore, precursor materials have homogeneous distribution of surface groups, e.g. silica, alumina, hollow microspheres, microgel, carbon and starch.

The present inventors have been working in the area of such novel tailor-made materials and disclosed one such material in a co-pending Indian Patent application 668/MUM/2008. This patent application claims a particle with bipolar topospecific characteristics, whose precursor is an asymmetric 1:1 or 2:1:1 clay particle having alternating tetrahedral and octahedral sheets terminating with a tetrahedral sheet at one external surface plane and an octahedral sheet at another external surface plane, wherein a chemical group, having greater than 3 carbon atoms, and selected from an organyl or an organoheteryl group, is attached to coordinating cations on the exterior side of one of the surface sheets. The present inventors have worked on incorporation of a specific embodiment of this material in a shaped solid cleaning composition and with extensive experiments involving preparation of such compositions (especially bars) and optimising the resultant cleaning property and bar integrity arrived at the present invention.

In view of the limitations in the prior art, one of the objects of the present invention is to overcome or ameliorate at least one of the disadvantages of the prior art, or to provide a useful alternative.

Another object of the present invention is to provide a shaped solid cleaning composition which on the one hand has similar or superior properties compared to compositions prepared with conventional surfactants, having less of their disadvantages like low biodegradability, irritation to the skin and high cost.

Yet another object of the present invention is to provide for a shaped solid personal cleaning composition, which can be prepared using a simple and easy to scale-up process.

Yet another object of the present invention is to provide for a shaped solid personal cleaning composition that utilises a novel material which is an alternative to conventional surfactant and also has the functionality of a structurant thereby minimising the need for using high amounts of conventional structuring agents.

SUMMARY OF THE INVENTION

According to one aspect of the present invention there is provided a shaped solid cleaning composition comprising:
(i) 10 to 80% of treated clay particles; and
(ii) 2 to 35% of a structuring agent;
wherein said treated clay particles are asymmetric 1:1 or 2:1:1 clay particles having alternating tetrahedral and octahedral sheets terminating with a tetrahedral sheet at a first external surface plane and an octahedral sheet at a second external surface plane, wherein a fatty acid or derivative thereof of carbon chain length 10 to 22 is attached to a coordinating cation on one of said first or said second exterior surface planes.

DETAILED DESCRIPTION OF THE INVENTION

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

The present invention relates to a shaped solid cleaning composition. By the term "cleaning composition" is meant a composition which is used to clean any substrate e.g. skin, hair or other external surfaces of human or animal body, or hard surfaces in homes, offices or any public or industrial location or soft/porous substrates like fabric. By "shaped solid" is meant a body in solid form which retains its shape after manufacture and during transport and storage. Examples of shaped solids include bars and tablets. The shaped solid cleaning composition of the invention comprises a novel material having both surface active properties and good structuring ability in shaping of the solid.

The precursor of the treated particle is an asymmetric 1:1 or 2:1:1 clay particle having alternating tetrahedral and octahedral sheets terminating with a tetrahedral sheet at a first exterior surface plane and an octahedral sheet at a second exterior surface plane. Particle of 1:1 clay is particularly preferred as precursor.

1:1 clays preferred according to the present invention include kaolinite and serpentine subgroups of minerals. The species included within kaolinite subgroup are particularly preferred viz. kaolinite, dickite, halloysite and nacrite.

The species included within serpentine subgroup are chrysolite, lizardite, and amesite.

2:1:1 clays preferred according to the present invention include chlorite group of minerals. Chlorite is also erroneously referred as 2:2 clay by some mineralogists. The chlorite comprises tetrahedral-octahedral-tetrahedral sheets like 2:1 clays, with extra weakly bound brucite like layer between tetrahedral layers.

The tetrahedral sheet preferably comprises coordinating tetrahedral cation of silicon. The tetrahedral sheet may also comprise isomorphously substituted coordinating tetrahedral cations which are not silicon. Isomorphously substituted coordinating tetrahedral cations include, but are not limited to, cations of aluminium, iron or boron.

The octahedral sheet preferably comprises coordinating octahedral cation of aluminium. The octahedral sheet may also comprise isomorphously substituted coordinating octahedral cations which are not aluminium. Isomorphously substituted coordinating octahedral cations include cations of magnesium or iron.

It is preferred that the fatty acid or derivative thereof of carbon chain length 10 to 22 is attached to the coordinating cations on the exterior side of one of the external surface sheets. Accordingly, the fatty acid or derivative thereof may be attached to coordinating cations on the exterior side of the tetrahedral sheet. Alternatively, the fatty acid is attached to coordinating cations on the exterior side of the octahedral sheet which is the more preferred aspect.

The treated particle used in the shaped solid cleaning composition of the invention is believed to have the property of anisotropic hydrophobicity which is possibly the reason for providing the surface active property responsible for the cleaning action. By anisotropicity is meant that the particle has two spatially distinct exterior faces having distinct surface characteristics wherein one of the distinct exterior faces is hydrophilic and the other distinct exterior face is hydrophobic.

In addition to providing the cleaning action, the treated particle provides structuring property to the shaped solid.

The cleaning composition of the invention also has the additional advantage in that the treated particle which acts as the surface active agent is particulate in nature thereby requiring lesser amount of water in rinsing the composition after its use. Thus the cleaning composition can be used with less water usage making it especially useful in places where there is shortage of water.

Yet another advantage of incorporating the treated particles in the shaped solid cleaning composition is that the composition may comprise very low amount of synthetic surfactant which may be as low as less than 5%. In a preferred aspect the composition is substantially free of synthetic surfactants. Synthetic surfactants are believed by many consumers to be harsh on skin when used for personal cleaning application or applied using the hand for cleaning any other surface and therefore incorporation of the treated clays provides for not only more inexpensive compositions since treated clays are less costly as compared to synthetic surfactants, but they are also more mild on the skin.

The treated particles are present in 10 to 80%, preferably to 80%, more preferably 40 to 70% by weight of the composition. The 40 to 70% is especially preferred since it provides the right balance of cleaning and structuring with this amount of treated particle in the composition thereby giving optimised performance and cost.

Although fatty acid or derivative thereof of carbon chain length 10 to 22 are attached to coordinating cation on one of said exterior surface planes of the particle, it is preferred that the carbon chain length is from 14 to 18. Preferred fatty acids are oleic acid, palmitic acid, stearic acid, myristic acid, linoleic acid or hydroxy stearic acid, most preferred fatty acids are oleic acid, palmitic acid, stearic acid, or myristic acid.

The shaped solid cleaning composition of the invention comprises a structuring agent which is preferably selected from the group consisting of biopolymers, soap, or inorganic structuring agents. The structuring agent is present in 2 to 35%, preferably 4 to 25%, more preferably 5 to 15% by weight of the composition. The 5 to 15% structuring agent is especially advantageous as this is a relatively low amount as compared to the amount present in conventional shaped solids. Such low amount of structuring agent is possible in the present invention due to the synergy of including treated clay which has multiple properties. The low amount of structuring agent thereby ensures lower cost. Suitable biopolymers for inclusion in the composition are starch, modified starch, guar gum, tamarind kernel polysaccharide or psyllium husk. Most preferred biopolymer is starch. Biopolymers when present in the composition of the invention are preferably present in 2 to 15% by weight of the composition.

When soap is the structuring agent in the present invention, it is preferably present in 5% to 25% by weight of the composition. When present, the carbon chain length of the soap which acts as a structuring agent is in the range of 12 to 18. The soap may also be formed insitu during the process of manufacture of the shaped solid composition. It is particularly preferred that the structuring agent is a combination of soap and starch.

The shaped solid cleaning composition of the invention may also comprise a structuring agent which is an inorganic structuring agent. This may be selected from alumino silicate, calcium silicate, calcium alumino silicate, boro silicate, boro alumino silicate, alumina, sodium phosphate, alumino phospho silicate or silica. These structuring agents are generally generated insitu and this is thereby a preferred method of incorporating these agents in the composition of the invention. Of these alumino silicate and calcium silicate are more preferred.

Alumino silicate is usually generated in-situ in the composition using a source of monomeric aluminium to condense with a silicate anion. The preferable components used for the generation of the structurant are aluminium sulphate and alkaline sodium silicate. It is also possible to incorporate readily available sodium alumino-silicate into the formulation. The alumino-silicate is preferably present in an amount in the range of 0.5 to 6% by weight of the composition.

Calcium silicate is usually generated in-situ in the composition from precursor material selected from a soluble calcium compound e.g. calcium hydroxide reacting with sodium silicate. Calcium silicate is preferably present in an amount in the range of 0.1 to 2%, more preferably 0.1 to 1% by weight of the composition.

Of the various types of shaped solid cleaning compositions of the invention, the bar form is most preferred. Cleaning bars may be prepared by many methods, of which the milled and plodded bars and cast bars are most commonly used.

A typical process to prepare milled and plodded bars to prepare the shaped solid composition of the invention is given below. The treated clay particles were first added to a suitable mixer e.g. a sigma mixer followed by addition of the structuring agents or their precursors with continuous agitation. Part of the water was added to prevent dusting during mixing. This was mixed till it formed a homogenous mass. The remaining part of the water was then slowly added to get a mass of desired consistency. Once the dough of desired consistency was formed, it was taken out and plodded through a screw extruder to get the desired shape and then cut into bars.

When the shaped solid cleaning composition of the invention is prepared by the milled and plodded route, it is preferred that the composition comprises 12 to 35% water, more preferably to 30% water.

A typical process to prepare the shaped solid composition of the invention using a melt cast route is given below. The melt to be processed to get a shaped product is prepared at a temperature higher than the Kraft temperature of the soaps present, which is typically higher than 80° C. in a water bath by melting the soap with water. The ingredients in the composition are then added to this melt to get a homogeneous dispersion. Water is adjusted till a pourable melt is formed. This melt is then poured in moulds of required shape and cooled under ambient condition or using chilled water circulation around the mould for faster cooling. Once solidified, the shaped composition is taken out and dried if required.

When the shaped solid cleaning composition of the invention is prepared by the melt cast route, it is preferred that the composition comprises 20 to 80% water, more preferably 40 to 60% water.

It is particularly preferred that the shaped solid cleaning composition of the invention comprises less than 5% non-soap surface active agents. This is especially advantageous since incorporation of the treated clays of the invention reduces the amount of other conventional surfactants like the non-soap surface active agents which are generally more expensive and also have the disadvantage that incorporation of high amounts of these agents makes preparation of shaped solids more difficult. A particularly preferred aspect of the invention provides for a composition which is substantially free of non-soap surface active agents.

The shaped solid cleaning composition of the invention may comprise other benefit agents depending on the end use of the cleanser. E.g. a personal cleaning bar may comprise moisturisers, emollients, sunscreens, or anti ageing compounds. Examples of moisturisers and emollients include humectants like polyols, glycerol, cetyl alcohol, Carbopol™, ethoxylated castor oil, paraffin oils, lanolin and its derivatives.

Silicone compounds such as silicone surfactants like DC3225C™ (Dow Corning) and/or silicone emollients, silicone oil (DC-200™ Ex-Dow Corning) may also be included. Sun-screens such as 4-tertiary butyl-4'-methoxy dibenzoylmethane (available under the trade name PARSOL 1789™ from Givaudan) and/or 2-ethyl hexyl methoxy cinnamate (available under the trade name PARSOL MCX™ from Givaudan) or other UV-A and UV-B sun-screens may also be incorporated. Water soluble glycols such as propylene glycol, ethylene glycol, glycerol, may be employed at levels upto 10%.

The personal cleaning compositions of the present invention may comprise a wide range of other optional ingredients. Examples of such optional ingredients include antioxidants, anti-aging agents, binders, biological additives, buffering agents, colorants, thickeners, polymers, astringents, fragrance, humectants, opacifying agents, conditioners, exfoliating agents, pH adjusters, preservatives, natural extracts, essential oils, skin sensates, skin soothing agents, and skin healing agents. Minor additives which may also be added include colour, preservatives and perfumes.

When the cleaning bar is for application in cleaning fabrics optional ingredients like builders, inorganic particulates, and other minor additives that serve various consumer desired functionalities may be added. Builders are generally incorporated in cleaning compositions for cleaning fabrics where the water available for cleaning is high in hardness. Builders are preferably inorganic and suitable builders include alkali metal aluminosilicates (zeolites), alkali metal carbonate, sodium tripolyphosphate (STPP), tetrasodium pyrophosphate (TSPP), citrates, sodium nitrilotriacetate (NTA) and combinations of these. Builders are suitably used in an amount ranging from 1 to 30% by weight of the compositions. Inorganic particulates are not an essential ingredient of the formulation but may be incorporated especially for hard surface cleaning compositions for providing abrasive benefits. Suitable inorganic particulates may be selected from particulate zeolites, calcites, dolomites, feldspars, silicas, silicates, other carbonates, bicarbonates, sulphates and polymeric materials such as polyethylene. The most preferred inorganic particulates are calcium carbonate (as Calcite), mixtures of calcium and magnesium carbonates (as dolomite), sodium hydrogen carbonate, borates, boric acid, sodium/potassium sulphate, zeolite, feldspars, talc, kaolin and silica. Other minor conventional ingredients may be included for specific functional benefits. These include enzymes, antiredeposition agents, fluorescers, colour, preservatives and perfumes, bleaches, bleach precursors, bleach stabilisers, sequestrants, soil release agents (usually polymers) and other polymers. These are optionally incorporated up to 10% by weight of the composition.

According to another aspect of the present invention there is provided a process to prepare a shaped solid cleaning composition through a milled and plodded process comprising the steps of:

(i) providing the treated clay particles, in a mixer;

(ii) adding the structuring agents or their precursors in to said mixer with agitation;

(iii) adding water to said mixer with agitation to get a mixture of desired consistency suitable for plodding;

(iv) plodding said mixture through an extruder to produce extrudates; and (v) cutting said extrudates into shaped solid cleaning compositions of desired size.

According to yet another aspect of the present invention there is provided a process to prepare a melt-cast shaped solid cleaning composition comprising the steps of:

(i) providing soap in a mixer at a temperature above the kraft boundary of said soap;

(ii) adding the treated clay particles, into said mixer with agitation to prepare a pourable melt;

(iii) pouring said pourable melt into moulds of desired shape to get shaped solid cleaning compositions.

According to yet another aspect of the invention there is provided a process to prepare a treated clay particle for use in the composition of the invention comprising the steps of (i) contacting asymmetric 1:1 or 2:1:1 clay particles having alternating tetrahedral and octahedral sheets terminating with a tetrahedral sheet at one external surface plane and an octahedral sheet at another external surface plane, with an alkali to increase the pH above 7;

(ii) adding an alkali metal salt of said fatty acid of carbon chain length 10 to 22, at a temperature between 50 and 150° C.;

(iii) adding a mineral acid to reduce pH below 7, and;

(iv) separating the treated particles from the reaction mixture.

The clay particle for use in the above process is preferably kaolinite, halloysite, dickite or nacrite, more preferably kaolinite.

It is particularly preferred that the precursor is first contacted with a mineral acid before contacting with the alkali. The mineral acids which are contacted with the precursor are preferably selected from sulphuric acid, nitric acid or hydrochloric acid, hydrochloric acid being preferred. Preferred concentration of minerals acids are in the range of 0.1 to 0.5 N. The alkali used to increase the pH above 8 is preferably alkali metal hydroxide, carbonate or bicarbonate, preferred alkali metal being sodium or potassium. Preferred concentration of alkali is from 0.01 to 0.5 N. The fatty acid salt is preferably added at a temperature between 60 to 95° C. The final pH below 7 is preferably between 6 to 6.9. The treated clay particles are separated from the reaction mixture, preferably by filtration.

The invention will now be demonstrated with the help of the following non-limiting examples

EXAMPLES

Example 1-3

Processibility and Cleaning Efficacy of Cleaning Bars Prepared as Per the Invention as Compared to Those Outside the Invention

Example—1

Cleaning Bar as Per the Invention

Cleaning bar as per composition shown in Table—1 was prepared. The bars were prepared using the milled and plodded soap bar making process which is given below:

The solid ingredients e.g. the powdery/granular ingredients were first added to a sigma mixer followed by corn starch. Part of the water was added to prevent dusting during mixing. Molten soap (when used) was then added and homogeneously mixed with the mass. Rest of the water was then slowly added to get the desired consistency of the mix. Once this is formed, it was taken out and plodded through a screw extruder to get the desired shape which was then cut into soap bars.

TABLE 1

| Composition | Example - 1, | Example - 2, | Example - 3[(1)] |
|---|---|---|---|
| Sodium soap[(2)] | — | — | 75.6 |
| Talc | — | — | 7.7 |
| Clay[(3)], wt % | 62.1 | — | — |
| Treated Clay[(4)], wt % | — | 59.8 | — |
| Corn Starch, wt % | 8.1 | 7.8 | — |
| Sodium Palmitate,, wt % | 5.0 | 4.8 | — |
| Water, wt % | To 100 | To 100 | To 100 |
| Penetration, mm | 2.5 | 2.2 | 2.0 |
| Detergency, % | 75 | 99 | 99 |

[(1)]The bar as per example -3 was a commercially available personal cleaning bar sold under the tradename Lifebuoy.

[(2)]The sodium soap here was salt of a blend of fatty acid of carbon chain length 12 to 18.

[(3)]Clay used was kaolinite

[(4)]Treated Clay: This was prepared as per the invention starting with kaolinite as the precursor. The process used to make the treated clay was as follows:
Kaolinite was used as a precursor. 500 gram of Kaolinite (commercial grade Kaolinite, ex. EICL) was added to 1000 ml of 0.1N hydrochloric acid (ex. Emerck) and the mixture was stirred using an overhead stirred for 30 minutes. This was followed by addition of sodium hydroxide pellets to this mixture under constant stirring on a table top magnetic strirrer to adjust the pH to about 12. Excess of sodium oleate[50 g] (99% purity, ex Loba) was then added to the mixture. The reaction mixture was stirred constantly at 90° C. for 6 hours and kept overnight (for 12 hours) to attain equilibrium. The pH of the system was next adjusted to 6.5 by addition of drops of 1N HCl to convert unreacted soap into its free fatty acid. The reaction mixture was centrifuged and the precipitated clay was repeatedly washed with water and acetone to remove traces of unreacted soap. The reacted clay was then dried at 55° C. in a hot air oven to obtain the treated particle.

It was found that there was no processing difficulty when bars were prepared as per Examples 1 to 3. They were analysed for penetration (using a penetrometer) and percentage detergency using the following protocol.

Penetrometer is an instrument that gives hardness of material. It measures the depth of penetration of a needle in the material for a given time. The measurements done here are using a hollow cone type needle for a time of seconds. The penetrometer used in the present set of measurements was a PNR10 model penetrometer manufactured by Petrotest Instruments.

The % detergency was measured using the following protocol: 10 μl of olive oil was spread on a polyester coated glass slide. A paste was prepared consisting of 0.5 g of the cleaning bar and 80 μl of water. The glass slide coated with the olive oil was washed with mg of the paste along with measured quantity of water. The glass slide was then dried and the % oil remaining on the glass slide was then measured. The % oil removed is the % detergency.

The data in Table—1 indicates that the cleaning bar as per the invention (Example—2) provides for no processing difficulty as compared to commercial bar (Example—3). Further, Example—2 provides comparable cleaning and is 70% lesser cost as compared to bar of Example—3. Further the bar containing the treated clay (Example—2) is far superior to one containing untreated clay (Example—1) in % detergency.

Examples 4 to 8

Cleaning Bars Prepared Using Various Structuring Agents

Several cleaning bars were prepared using various structuring agents the compositions of which are shown in Table—2 below:

TABLE 2

| Composition | Example - 4 | Example - 5 | Example - 6 | Example - 7 | Example - 8 |
|---|---|---|---|---|---|
| Treated Clay, wt % | 65.2 | 57.1 | 71.1 | 57.7 | 66.7 |
| Structuring agent | SCMC[(1)] | Corn Starch | Corn Starch | Alumino silicate | Soap[(2)] |
| Structuring agent, wt % | 13.0 | 11.4 | 5.2 | 6.0 | 12.5 |
| Water, wt % | To 100 | To 100 | To 100 | To 100 | To 100 |

[(1)]SCMC is sodium carboxy methyl cellulose

[(2)]Soap used here was sodium salt of mixture of fatty acids derived from oil blends where the carbon chain length was 12 to 18.

There were no processing problems in preparing cleaning bars of Examples 4 to 8 using the milled and plodded route. Further, the cleaning efficacy and firmness of the bar (as measured by penetration) were found to be comparable to that of Example—2.

The invention thus provides for a shaped solid cleaning composition comprising a novel material which is an alternative to conventional surfactant which on the one hand has similar or superior properties compared to conventional surfactants while being low in cost. Further the shaped solid cleaning compositions are easy to prepare using a simple process and minimises the need for large amounts of structuring agents which can be expensive.

The invention claimed is:

1. A shaped solid cleaning composition comprising (i) 30 to 80% by weight of treated clay particles; and (ii) 2 to 35% by weight of a structuring agent selected from the group consisting of biopolymers, soap and inorganic structuring agents;

wherein said treated clay particles are asymmetric 1:1 or 2:1:1 clay particles having alternating tetrahedral and octahedral sheets terminating with a tetrahedral sheet at a first external surface plane and an octahedral sheet at a second external surface plane, wherein a fatty acid or salt thereof of carbon chain length 10 to 22 is attached to a coordinating cation on one of said first or said second exterior surface planes, wherein the shaped solid cleaning composition comprises less than 5% by weight of synthetic surfactant.

2. A shaped solid cleaning composition as claimed in claim 1 wherein said fatty acid or salt thereof is attached to the second external surface plane having an octahedral sheet.

3. A shaped solid cleaning composition as claimed in claim 1 wherein said biopolymer is selected from the group consisting of starch, modified starch, guar gum, tamarind kernel polysaccharide and psyllium husk.

4. A shaped solid composition as claimed in claim 1 wherein said inorganic structuring agent is selected from the group consisting of alumino silicate, calcium silicate, calcium alumino silicate, boro silicate, boro alumino silicate, alumina, sodium phosphate, alumino phospho silicate and silica.

5. A shaped solid cleaning composition as claimed in claim 1 wherein said fatty acid is selected from the group consisting of oleic, palmitic, stearic or myristic acid and salts thereof.

6. A shaped solid cleaning composition as claimed in claim 1 wherein said soap structuring agent is a substantially water insoluble salt of fatty acid of carbon chain length 12 to 22.

7. A process to prepare a milled and plodded shaped solid cleaning composition as claimed in claim 1 comprising the steps of (i) providing said treated clay particles in a mixer;

(ii) adding said structuring agents or precursors thereof into said mixer with agitation;

(iii) adding water to said mixer with agitation to get a mixture of desired consistency suitable for plodding;

(iv) plodding said mixture through an extruder to produce extrudates; and (v) cutting said extrudates into shaped solid cleaning compositions of desired size.

8. A process as claimed in claim 7 wherein the shaped solid cleaning composition comprises 12 to 35% by weight water.

9. A process to prepare a melt-cast shaped solid cleaning composition as claimed in claim 1 comprising the steps of (i) providing soap in a mixer at a temperature above the kraft broundary of said soap;

(ii) adding said treated clay particles into said mixer with agitation to prepare a pourable melt;

(iii) pouring said pourable melt into moulds of desired shape to get shaped solid cleaning compositions.

10. A process as claimed in claim 9 wherein the shaped solid cleaning composition comprises 20 to 80% by weight water.

11. A process as claimed in claim 7 wherein said treated clay particle is prepared by a process comprising the steps of (i) contacting asymmetric 1:1 or 2:1:1 clay particles having alternating tetrahedral and octahedral sheets terminating with a tetrahedral sheet at one external surface plane and an octahedral sheet at another external surface plane, with an alkali to increase the pH above 7;

(ii) adding an alkali metal salt of said fatty acid of carbon chain length 10 to 22, at a temperature between 50 and 150° C.;

(iii) adding a mineral acid to reduce pH below 7, and;

(iv) separating the treated particles from the reaction mixture.

12. A process as claimed in claim 11 wherein said clay particle is kaolinite, halloysite, dickite or nacrite.

13. A process as claimed in claim 12 wherein said clay particle is kaolinite.

* * * * *